April 24, 1962  E. G. TRUNK  3,031,657
ALTITUDE COMPUTER
Filed Oct. 27, 1958  2 Sheets-Sheet 1
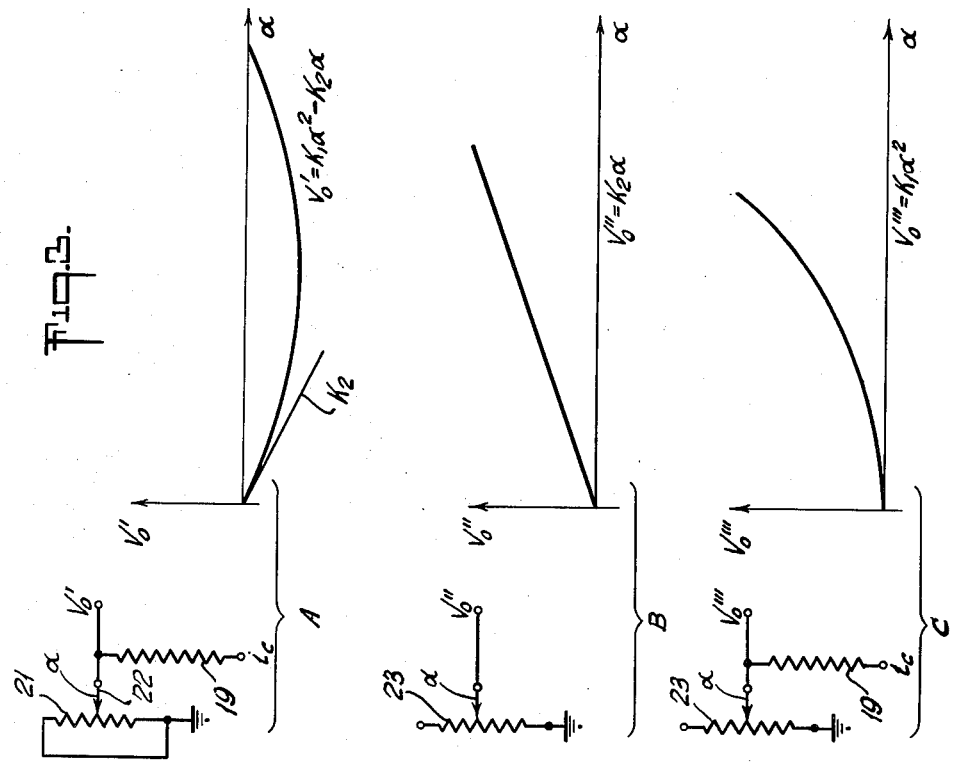
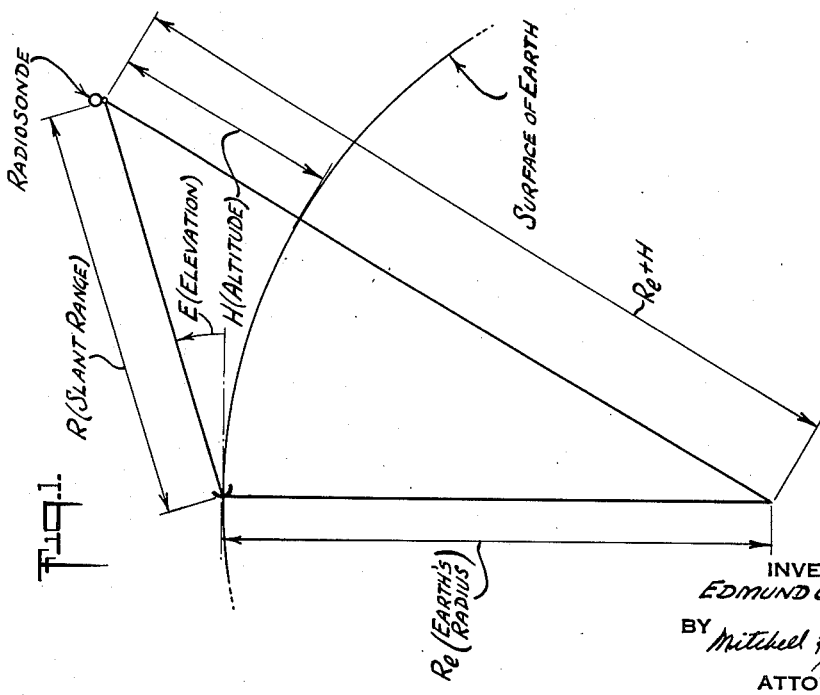
INVENTOR
EDMUND G. TRUNK
BY Mitchell & Bechert
ATTORNEYS April 24, 1962

E. G. TRUNK 3,031,657

ALTITUDE COMPUTER

Filed Oct. 27, 1958

INVENTOR
EDMUND G. TRUNK

BY *Mitchell & Beckert*

ATTORNEYS

United States Patent Office 3,031,657
Patented Apr. 24, 1962

3,031,657
ALTITUDE COMPUTER
Edmund G. Trunk, East Meadow, N.Y., assignor to Servo Corporation of America, New Hyde Park, N.Y., a corporation of New York
Filed Oct. 27, 1958, Ser. No. 769,748
4 Claims. (Cl. 343—5)

This invention relates to ground equipment including an altitude computer for determining altitude of a flying object using approximation techniques.

With the advent of space exploration, considerable interest has been shown in balloon exploration of the earth's atmosphere. A balloon equipped with radio instruments for detecting and transponding desired information to a ground station is called a radiosonde. In order that the detected information may be intelligently interpreted, it is usually necessary to know accurately the altitude of the balloon at the time the radio information is being translated by the airborne equipment. Ground system equipment, operating on the principles of tracking radar, may be employed to measure the slant range and elevational angle from an observation point to the flying object, e.g., the radiosonde.

If the earth's curvature is ignored, it is possible to compute altitude from knowledge of the slant range and elevational angle. The equation for altitude may be written as $H = R \sin E$, where $R$=slant range and $E$=elevational angle.

Of course, ignoring the earth's curvature does not provide an answer of sufficient accuracy for most telemetering purposes. Accordingly, a more accurate equation, which reflects the earth's curvature, has been adopted. This equation is:

$$H + \frac{H^2}{2R_e} = R \sin E + \frac{R^2}{2R_e}$$

where $R_e$ is the radius of the earth. This equation is revised into the form:

$$H = R \sin E + \frac{R^2 \cos^2 E}{2R_e}$$

The revised equation is not exact and introduces a small error in the computed value of H.

There are several disadvantages associated with the systems which have been devised for the solution of the revised equation. For example, the factor $$\frac{R^2 \cos^2 E}{2R_e}$$

requires two precision, non-linear potentiometers, one for $R^2$ and the other for $\cos^2 E$. The two non-linear potentiometers are, of course, expensive and, in addition, require gearing arrangements, which also add to the expense of the overall system. Still further difficulty is introduced into the known system by instrumentation required to sum the quantities $$R \sin E + \frac{R^2 \cos^2 E}{2R_e}$$

Accordingly, it is an object of this invention to provide equipment which is capable of measuring altitude accurately, without using the additional non-linear potentiometers required in the conventional systems for generating the earth's curvature terms.

It is a further object of this invention to provide an altitude computer which does not depend on voltage summation for determining altitude.

It is a feature of the invention to derive altitude information directly from the original altitude equation without resorting to a compromise equation, which introduces some error into the system.

It is a further object of this invention to provide novel techniques for deriving the terms $$\frac{H^2}{2R_e} \text{ and } \frac{R^2}{2R_e}$$

In accordance with an aspect of the invention, there is provided a ground station tracking unit for determining altitude of a flying object by solving the equation $$H + \frac{H^2}{2R_e} = R \sin E + \frac{R^2}{2R_e}$$

where $H$=altitude, $R$=slant range, $R_e$=earth's radius and $E$=elevation angle measured between the slant range line and the horizontal plane. Means is provided for tracking the flying object and determining the elevational angle and the range of the object from the tracking means. The tracking means is coupled over a first servomechanism to a wiper arm of a sine function potentiometer. A source of fixed voltage is connected in series with the potentiometer so that the voltage on the wiper arm is proportional to $\sin E + K$ where K is the fixed voltage. The voltage $\sin E + K$ is applied across a "range" potentiometer, whose wiper arm is driven by a second servomechanism which is responsive to ranging information from the tracking means. The function $$\frac{R^2}{2R_e}$$

is generated by injecting a constant current of predetermined magnitude into the wiper arm of the "range potentiometer." The magnitude of the current is selected to produce a voltage across the "range" potentiometer proportional to the quadratic expression $$\frac{R^2}{2R_e} - KR\alpha$$

where $\alpha$ is the rotational angle of the servomotor shaft. Thus, the superposed voltages at the wiper arm of the range potentiometer are:

$$R \sin E + KR + \frac{R^2}{2R_e} - KR$$

or $$R \sin E + \frac{R^2}{2R_e}$$

This voltage is applied to one output of an "altitude" servomechanism having a pair of balancing inputs; the other input being coupled to a wiper arm of a follow-up "altitude" potentiometer. A voltage simulating the expression $$H + \frac{H^2}{2R_e}$$

is derived at the wiper arm of the "altitude" potentiometer simply by applying a constant voltage across the potentiometer slightly greater than that required to generate a voltage proportional to the term "H." Since the increase due to the term $$\frac{H^2}{2R_e}$$

is relatively small as compared to H, the linear approximation introduces only a small error into the computation. When the altitude servomechanism is balanced, the voltage on the wiper arm of the "altitude" potentiometer is proportional to the altitude if a linear potentiometer is used.

The above-mentioned and other features and objects of this invention and the manner of attaining them will become more apparent and the invention itself will be best understood by reference to the following description of an embodiment of the invention taken in conjunction with the accompanying drawing, wherein:

FIGURE 1 is a geometric diagram showing derivation of the basic equation for altitude;

FIGURE 2 is a schematic diagram of the tracking system including the computer circuit for solving the equation for altitude; and FIGURES 3A, 3B and 3C are diagrams showing the derivation of the term $$\frac{R^2}{2R_e}$$

Referring first to FIGURE 1, a triangulation diagram is shown from which the basic equation for altitude may be derived. In the figure, $R$=slant range, $H$=altitude, $R_e$=earth's radius and $E$=elevation angle. By the law of cosines, $$(R_e+H)^2 = R^2_e + R^2 - 2RR_e \cos(90°+E)$$

$$R^2 + 2HR_e + H^2 = R^2_e + R^2 + 2RR_e \sin E$$

$$H + \frac{H^2}{2R_e} = R \sin E + \frac{R^2}{2R_e}$$

In radar and servomechanism equipment, slant range and elevation angle are derived as analog quantities and may be represented by shaft rotation. By virtue of the design of the tracking antenna, e.g., 1 in FIGURE 2, the antenna position is defined by azimuth and elevation angle. The elevational movement of the antenna 1 operates a conventional servomechanism comprising a transmitter, shown diagrammatically at 2 and a control transformer shown generally at 3. The output of the control transformer is amplified at 4 and the amplified energy drives a servomotor 5. The slant range is determined by known radar techniques and operates a servomechanism, comprising a ranging unit 6, which drives a transmitter 7 and a servo-control transformer 8. The output of the transformer 8 is amplified at 9 and the amplified energy drives a servomotor 10.

In the interest of logical explanation, the conventional circuit for solving the equation $H = R \sin E$ will first be described. The novel aspects of this invention will then be readily perceivable. The circuit for solving the equation, $H = R \sin E$, comprises a sine function potentiometer 11, a linear "range" potentiometer 12, amplifier 13, servomotor 14 and linear "altitude" potentiometer 15. The wiper arm 16 of potentiometer 11 is mechanically connected to the servomotor 5, and the wiper arm 17 of potentiometer 15 is mechanically connected to the servomotor 14. The range and elevation quantities, therefore, may be expressed in terms of shaft rotation $\alpha$.

Constant voltages are applied across the potentiometers 11 and 15. By applying a constant excitation voltage to the potentiometer 11, the voltage on the wiper arm 16 is proportional to $\sin E$. This voltage serves as the excitation for the linear "range" potentiometer 12. Thus, the output of the range potentiometer is proportional to $R \sin E$.

This voltage derived from the "range" potentiometer 12 is applied over its wiper arm 17 to one output of the amplifier 13 having a pair of balancing inputs. The servomotor 14, energized by the amplifier 13, drives the "altitude" potentiometer wiper arm 17 until the feedback voltage applied to the other input of the amplifier 13 equals the applied voltage from the range potentiometer 12. The motor, or motor input, is then balanced or neutralized and the rotation of the shaft of the wiper arm 17 represents the altitude.

The novel aspect of this invention resides in solving the terms $$\frac{H^2}{2R_e} \text{ and } \frac{R^2}{2R_e}$$

in the basic altitude equation utilizing only a few additional components and eliminating the non-linear potentiometers and gearing trains previously employed for the solution of the terms.

The first term $$H + \frac{H^2}{2R_e}$$

of the equation is solved by taking a linear approximation of the term $$\frac{H^2}{2R_e}$$

Since altitude computers of the type to which this invention relates are generally limited to twenty miles in altitude and 125 miles in slant range, the denominator $R_e$ will always be much greater than the numerator $H^2$. Further, the term $$\frac{H^2}{2R_e}$$

is small relative to $H$. A curve plotted for the function $$H + \frac{H^2}{2R_e}$$

against $H$ is just slightly curvilinear and may be considered linear without introducing an intolerable error into the system. Standard requirements permit an altitude error up to 0.05% of the slant range, or 50 feet (whichever is greater) for elevation angles below 45°, and an error up to 0.1% of slant range or 50 feet (whichever is greater) for elevation angles greater than 45°.

By way of example, the following table illustrates the difference between a linear approximation and the true value of $$\frac{H^2}{2R_e}$$

at various altitudes:

| H (ft.) | $\frac{H^2}{2R_e}$ (ft.) | Linear Approximation (ft.) | Error (ft.) |
|---|---|---|---|
| 120,000 | 259 | 195 | −64 |
| 90,000 | 146 | 146 | 0 |
| 60,000 | 65 | 97 | +32 |
| 30,000 | 16 | 49 | +33 |
| 0 | 0 | 0 | 0 |

The increase to the altitude expression $$H + \frac{H^2}{2R_e}$$

due to the term $$\frac{H^2}{2R_e}$$

is relatively small, and in accordance with the invention is accomplished by simply increasing the excitation voltage (over what is required for H) across the potentiometer 15 by 0.16%. The values given in the table above are those obtained after increasing the voltage across the potentiometer 15. As seen, the approximation is accurate at zero and 90,000 feet and an error of not more than 64 feet is introduced at any altitude under 120,000 feet.

The generation of the voltage for the second term $$\frac{R^2}{2R_e}$$

cannot be based on a straight line approximation, because its maximum value is fifty times that of $$\frac{H^2}{2R_e}$$

and a greater accuracy is required.

The function $$\frac{R^2}{2R_e}$$

is obtained by injecting a constant current into the wiper arm 17 over a high resistance 19, and by connecting a resistor 20 in series with the potentiometer 11. The constant current is denoted by the reference character $i_c$.

Referring now to FIGURES 3A, 3B and 3C, there is shown on the left-hand side, circuits for producing the functions illustrated by curves on the right-hand side of the drawing.

In FIGURE 3A, there is shown a standard potentiometer 21 including a wiper arm 22; the constant current source being connected to the wiper arm 22. Since the resistance at the opposite terminals of the potentiometer is zero and gradually increases towards the midpoint, the voltage $V'_0$ on the wiper arm follows a quadratic curve, as shown. The quadratic equation may be written as:

$$V'_0 = K_1 \alpha^2 - K_2 \alpha$$

where $K_1$ and $K_2$ are constants and $\alpha$ is the rotational angle of the servomotor shaft. With proper selection of the constant current, $K_1$ may be made equal to $$\frac{1}{2R_e}$$

so that the voltage on the wiper arm, $$V'_0 = \frac{\alpha^2}{2R_e} - K_2 \alpha$$

The slope of the curve at the origin is equal to the constant $K_2$.

Since it is desired to produce the term $$\frac{R^2}{2R_e}$$

the linear function $K_2 \alpha$ must be removed from the total function. This is accomplished by generating a voltage in series with the potentiometer 11 having the same slope as $K_2$ but of opposite sense. The mechanics for accomplishing this is shown in FIGURE 3B. Since the curve is linear, the desired slope is obtained by adjusting the tap on a variable resistor 23 until a voltage $V''_0 = K_2 \alpha$ is generated. In FIGURE 2 this resistor is shown at 20. The voltage across the resistor 20 is added to the voltage $\sin E$ generated by the potentiometer 11. Thus, the total voltage at the wiper arm 16 is $\sin E + K_2$. This constitutes the excitation voltage applied across the "range" potentiometer 12.

If the functions 3A and 3B are superposed, the linear terms cancel and there remains only the square law function shown in FIGURE 3C. In other words, the voltage at the wiper arm 17 is the sum of the voltages due to the constant current injection, the added fixed voltage, and the $\sin E$ voltage. Thus:

$$V_0 = R \sin E + K_2 \alpha + \frac{\alpha^2}{2R_e} - K_2 \alpha; \quad V_0 = R \sin E + \frac{\alpha^2}{2R_e}$$

Since $\alpha$ is the shaft rotation equivalent of the slant range R, the term $$\frac{\alpha^2}{2R_e}$$

is the equivalent of $$\frac{R^2}{2R_e}$$

This total voltage is applied to the amplifier 13 and the corresponding amplified energy is applied to the servomotor 14, which drives the wiper arm 17. Thus, the voltage applied to one input of the amplifier 13 is the analog of the altitude term $$H + \frac{H^2}{2R_e}$$

and the voltage applied to the other input of amplifier 13, at balance, is the analog of $$R \sin E + \frac{R^2}{2R_e}$$

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:
1. A ground station tracking unit for determining altitude of a flying object by solving the equation

$$H + \frac{H^2}{2R_e} = R \sin E + \frac{R^2}{2R_e}$$

where $H$=altitude, $R$=slant range, $R_e$=earth radius, and $E$=elevation angle measured between the slant range line and the horizontal plane, comprising mechanical tracking means adapted to be elevationally rotated in tracking said object, electrical means for determining the range of the object from the tracking means, a sine function generator comprising a potentiometer, a first servomechanism coupled to the wiper arm of said potentiometer and responsive to the elevational movement of said tracking means for driving said wiper arm accordingly, a source of fixed voltage connected in series with said potentiometer, a source of constant voltage coupled across said potentiometer and said source of fixed voltage, whereby the voltage on the wiper arm is proportional to $\sin E + K$ where K is a constant, a range potentiometer coupled to said wiper arm, whereby said voltage $\sin E + K$ is applied thereacross, a servomechanism coupled to the wiper arm of said range potentiometer and responsive to the range information derived from said tracking means for driving said wiper arm accordingly, means for generating the function $$\frac{R^2}{2R_e}$$

comprising a source of constant current of predetermined magnitude coupled to the wiper arm of said range potentiometer, the magnitude of said current being selected to produce a voltage at the output of said range potentiometer proportional to the quadratic expression $$\frac{R^2}{2R_e} - KR$$

whereby the superposed voltages across said range potentiometer are:

$$R \sin E + KR + \frac{R^2}{2R_e} - KR$$

or $$R \sin E + \frac{R^2}{2R_e}$$

an altitude servomechanism having a pair of balancing inputs, one of said inputs being coupled to the wiper arm of said range potentiometer, an altitude potentiometer, the wiper arm thereof being coupled to the other of said inputs, said servomechanism having an output member for driving the last-mentioned wiper arm means for simulating a voltage from the altitude potentiometer proportional to $$H + \frac{H^2}{2R_e}$$

comprising a source of constant voltage, means for applying said constant voltage across the altitude potentiometer of sufficient magnitude to include the increase due to the term $$\frac{H^2}{2R_e}$$

the quantity $$\frac{H^2}{2R_e}$$

being relatively small as compared to H, whereby when said altitude servomechanism is balanced the voltage at the wiper arm thereof is proportional to the altitude.

2. The unit according to claim 1, wherein said range potentiometer is linear.

3. The unit according to claim 2, wherein said source of constant current comprises a resistor of large magnitude connected to the wiper arm of said range potentiometer.

4. The unit according to claim 2, wherein said altitude potentiometer is linear, and since the term $$\frac{H^2}{2R_e}$$

is small relative to H, the error introduced by deriving a voltage from said linear potentiometer is correspondingly small.

References Cited in the file of this patent

UNITED STATES PATENTS

| | | |
|---|---|---|
| 2,444,770 | Fyler | July 6, 1948 |
| 2,444,771 | Fyler | July 6, 1948 |

FOREIGN PATENTS

| | | |
|---|---|---|
| 611,613 | Great Britain | Nov. 2, 1948 |